S. T. FIELD.
Telegraph Cable.

No. 53,430.

Patented March 27, 1866.

Witnesses:
John F. Luhring
R. N. Carter

Inventor
Samuel T. Field

UNITED STATES PATENT OFFICE.

SAMUEL T. FIELD, OF ST. LOUIS, MISSOURI.

IMPROVEMENT IN TELEGRAPH-CABLES.

Specification forming part of Letters Patent No. 53,430, dated March 27, 1866.

*To all whom it may concern:*

Be it known that I, SAMUEL T. FIELD, of the city of St. Louis, county of St. Louis, and State of Missouri, have invented a new and useful Improvement in Elastic Cables, of which the following is a full and clear description, reference being had to the accompanying drawings, forming part of this specification.

My invention relates to an elastic cord upon which is coiled helicoidally one or more mediums of electric conduction.

Figure 1:
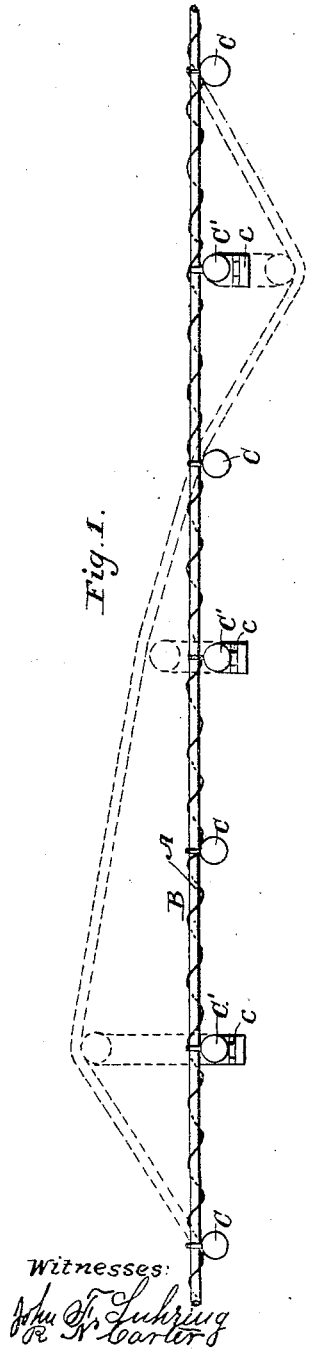
Figure 2:
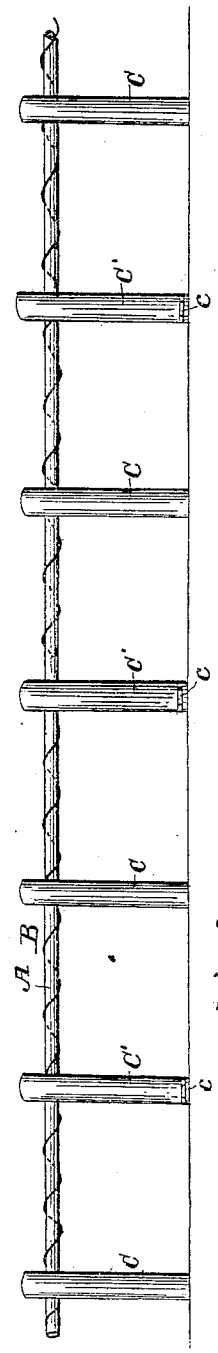
Figure 3:
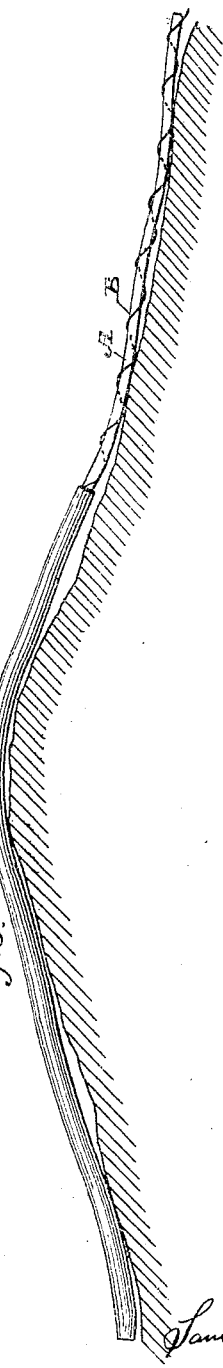

Figure 1 is a plan of my improved cable attached to vertical posts, as is usual in overland routes. Fig. 2 is an elevation of the overland cable. Fig. 3 is an elevation of a submarine cable with an insulating covering.

A represents a cylindrical elastic cord, which forms the core of the cable. It may be of rubber or of the most durable elastic substance known. About this yielding cord is wound helicoidally one or more conducting-wires, B.

The cable is secured to the posts C and C', secured in the ground in the usual manner.

The superiority in my cable over others is the yielding properties of B. In cases of storms, when the sustaining-posts are thrown down, the cable, on account of its peculiar structure, readily accommodates itself to a new position.

In the submarine cable shown in Fig. 3 the elastic cable is sheathed in a non-conducting and yielding cover, D, impervious to water. It conforms to the inequalities of the surface, and is consequently less liable to rupture than the ordinary cable.

Having fully described my improved cable and shown its advantages, I make the following claim:

The elastic cable composed of parts A and B, combined with the non-conducting and yielding cover D.

SAMUEL T. FIELD.

Witnesses:
ROBERT MOORE,
R. N. CARTER.